Oct. 14, 1952 W. T. DUNN 2,613,775
VEHICLE BRAKE

Filed May 22, 1947 3 Sheets-Sheet 1

INVENTOR.
William T. Dunn
BY
Harness and Harris
ATTORNEYS.

Oct. 14, 1952 — W. T. DUNN — 2,613,775
VEHICLE BRAKE
Filed May 22, 1947 — 3 Sheets-Sheet 2

INVENTOR.
William T. Dunn.
BY Harness and Harris
ATTORNEYS.

Oct. 14, 1952 — W. T. DUNN — 2,613,775
VEHICLE BRAKE
Filed May 22, 1947 — 3 Sheets-Sheet 3

INVENTOR.
William T. Dunn
BY
Harness and Harris
ATTORNEYS.

Patented Oct. 14, 1952

2,613,775

UNITED STATES PATENT OFFICE 2,613,775

VEHICLE BRAKE

William T. Dunn, Detroit, Mich., assignor to Chrysler Corporation, Highland Park, Mich., a corporation of Delaware Application May 22, 1947, Serial No. 749,729

34 Claims. (Cl. 192—4)

1

This application relates to the association of a braking means with the driving means of a motor vehicle.

It is usual practice to provide a motor vehicle with a special brake that may be applied when the vehicle is parked or when the vehicle is being maneuvered on inclines. If this special brake is defective as may frequently be the case, there may be no way of holding the vehicle in the above cases. It has been customary to park a vehicle in gear, but the practice is subject to the drawback that the vehicle may move if the incline on which it is parked is sufficient to cause the engine to turn over. However, it is dangerous and often impossible to start the engine by a conventional electrically operated starter when the vehicle is in gear, and so it may be impossible to hold the vehicle by the in gear method at a time when the engine is to be started. If the vehicle is provided with a step-drive or fluid power-transmitting device at some point between the driving wheels and the engine, the engine cannot be used to brake the car except to keep the vehicle below a speed at which the driven part of the fluid device will effectively attempt to drive the driving part. Accordingly, it becomes desirable to provide, in addition to the wheel brakes, some supplementary braking means that will be effective under the conditions outlined above, and I have provided such a braking means.

An object of the present invention is to provide an improved braking means for a motor vehicle of a type that will prevent movement of the vehicle either forwards or backwards depending upon the selection made. The braking means may be associated with a conventional change-speed transmission in order to prevent forward movement or backward movement.

A further object is to associate a braking means that may take the form of a one-way brake with a main clutch of a motor vehicle so that the condition of the clutch may determine whether the braking means is to be operative.

Another object is to associate a one-way brake with a motor vehicle driven by an engine acting through a fluid coupling.

Still another object is to provide improvements in operating means for a clutch associated with a change-speed transmission as part of vehicle-propelling means and with a one-way brake acting with the clutch and transmission to hold the vehicle against movement as desired.

A still further object is to associate a one-way brake with a driving apparatus involving a fluid

2 power-transmitting device such as a fluid coupling, torque converter, magnetic clutch or similar slip-drive unit whereby movement in a direction opposite to the direction of drive is prevented which movement might otherwise be possible because of the presence of the fluid power-transmitting device.

Still another object is to provide improvements in a one-way holding device in which undesirable drag between the parts of the holding device is eliminated. This holding device may be a one-way brake used in conjunction with a change-speed transmission and a main clutch between the transmission and an engine for preventing undesired movement of a vehicle in a forward or rearward direction.

Other objects will appear from the disclosure.

The reference character 10 designates a driving shaft, which may be an engine driven shaft such as a crankshaft. The driving shaft 10 is connected by screws 11 and nuts 12 to a casing 13 of a fluid coupling 14. An impeller 15 is secured in suitable manner to the casing 13. A runner 16, positioned in juxtaposed relation to the impeller 15 is secured to a hub part 17. The hub part 17 is journalled at one end exteriorly by means of a ball bearing 18 on the impeller casing 13 and interiorly by means of roller bearings 19 upon the reduced end of a driven shaft 20. The other end of the hub member is journalled by roller bearings 21 upon the driven shaft 20. A seal 21a acts between one end of the casing 13 and the hub 17 to keep fluid within the casing. A member 22, forming part of the driving side of a clutch 23 is keyed as indicated at 23a to the hub part 17. The driving side of the clutch 23 also includes a cover 24 secured by screws 25 to the member 22, and a pressure ring 26 urged by springs 27 toward the member 22, thereby causing a member 28 constituting the driven side of the clutch 23 to be clamped between the pressure ring 26 and the member 22. The driven member 28 comprises a hub 28ª having a flange 28ᵇ, a plate 28ᶜ formed of inner and outer sections, friction facings 28ᵈ on the outer section, a cover plate 28ᵉ attached to the inner section of the plate 28ᵈ by rivets 28ᶠ, only one being shown, and a plurality of circumferentially extending peripherally spaced coil springs 28ᵍ. The hub flange 28ᵇ lies between the plate 28ᶜ and the cover plate 28, and the springs 28ᵍ act between the hub flange and the plates to permit a small angular movement of the disks with respect to the hub for easing shocks. The hub 28ª is keyed or splined as indicated at 29 to the driven shaft 20. The driven shaft 20 constitutes the input shaft of a transmission 30 including a casing 31. One end of the shaft 20 projects into the transmission casing 31 and has formed thereon a gear 32 and a toothed section 33 engageable by a driving sleeve 34. In the position of parts shown in Fig. 1 a synchronizer ring 35 is positioned between the toothed section 33 and the sleeve 34. The gear 32 continually meshes with a gear 36 which is mounted upon and drivingly connected to a compound gear unit 37 by means of a one-way clutch 38. The compound gear unit 37 has a gear section 39 continually meshing with a gear 40 that is rotatably mounted on the output shaft 45. One end of the gear 40 carries in axially slidable driving relation the sleeve 34, and the other end of the gear has a toothed section 41 engageable by a toothed sleeve 42, a synchronizer ring 43 being between the sleeve 42 and the toothed section 41. The sleeve 42 has a sliding driving connection with an intermediate driving member 44 keyed to an output shaft 45, as indicated at 45ª. The sleeve 42 is selectively engageable either with the toothed section 41 and the gear 40 or with a toothed section 46 upon a gear 47, there being a synchronizer ring 47ª between the toothed section 46 and the sleeve 42. The gear 47 continually meshes with a gear section 48 on the compound gear unit 37. A gear 49 is keyed as indicated at 50 to the output shaft 45. An idler gear 51, shown in dash-dot lines, continually meshes with the gear section 48 and is axially slidable into and out of engagement with the gear 49.

Figure 1:
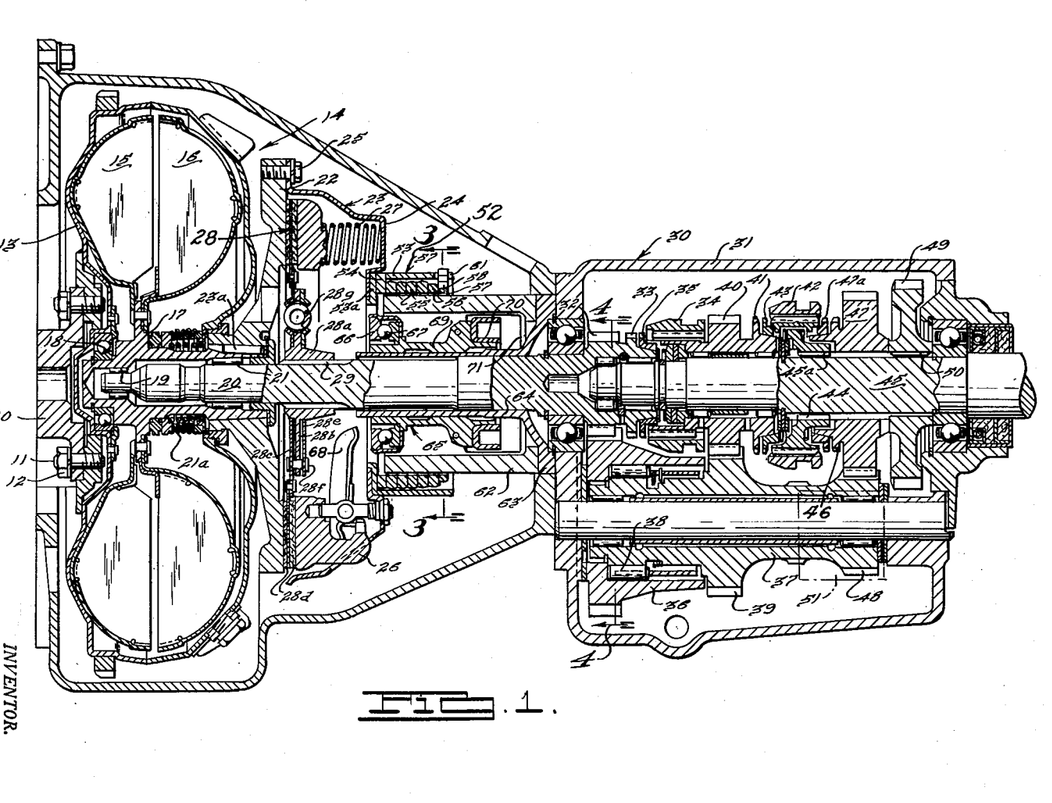
Fig. 1 is a longitudinal section of a driving means comprising a fluid coupling, a clutch, and a change speed transmission, with which driving means the novel brake of the present invention is associated.

With the driving side of the clutch 23 is associated a one-way brake 52, comprising a tubular section 53, a spiral member 55, a centrifugal weight 58 on the spiral member 55, and an outer fixed sleeve 62. To the clutch cover 24 is suitably secured, for example, by soldering or welding a flanged end 53ª of tubular section 53. The tubular section 53 has an opening, undesignated, receiving an outwardly extending end 54 of the spiral or coiled member 55 positioned within the tubular section 53. Beginning at a turn 56 next to the last at the right end, the spiral member 55 decreases in thickness and is relatively thin at the last turn 57. This decrease in thickness is well illustrated in Fig. 3. At the reduced end of the spiral member 55 is attached the centrifugal weight 58. The reduced end of the spiral member 55 is bent back upon itself as indicated at 59 and fits in a recess, undesignated, in the weight 58. A screw 60, extending through the spiral member 55 and into the weight 58, aids the bent end 59 in retaining the weight on the reduced end of the spiral member. As shown, the weight 58 projects radially outwardly from the spiral member 55 and is positioned in a wide recess 61 formed at the right end of the tubular section 53, which recess permits the necessary peripheral and outward movement of the weight 58 during operation. Positioned within the coil 55 is the outer fixed sleeve 62, which is appropriately attached to the transmission casing 31. Let us assume that the engine will act through the fluid coupling 16 to drive the driving side of the clutch 23, the tubular section 53, and the spiral member 55 in a counterclockwise direction, as viewed in Fig. 3. It is obvious that this action will tend to unwind the spiral member 55 so that it will not grip the outer sleeve 62. Sufficient speed of the spiral member will cause the centrifugal weight 58 to move outwards, thereby relieving drag of the spiral member 55 on the sleeve 62. If the driving side of the clutch 23 were to attempt to rotate in a clockwise direction, the resultant attempted rotation of the tubular section 53 and the spiral member 55 in the same direction would cause the spiral member 55 to wind up, thereby gripping the fixed anchor sleeve 62 and being prevented from clockwise rotation. The reduction in thickness of the spiral member 55 at its free end as indicated at 56 and 57 makes this end into a so-called "teaser" portion by giving the end sufficient flexibility to be readily responsive to appropriate direction of rotation so as to grip or to release the fixed sleeve 62.

Positioned between the fixed sleeve 62 and the transmission casing 31 is a flange 63 of an inner fixed sleeve 64, which immediately surrounds the input or driven shaft 20. Mounted on the sleeve 64 within the sleeve 62 is an actuating mechanism 65 for the clutch 23. This mechanism comprises a ring 66, for contacting the inner end of the release levers 68 of the clutch 23, a ball bearing 67, backing the ring 66, a sleeve 69, and a fork 70 engaging an enlarged end on the sleeve 69 and protruding through an opening 71 in the outer fixed sleeve 62.

The clutch 23 is released by movement to the left, as viewed in Fig. 1, of the actuating mechanism 69 applied through the fork 70. The ring 66 engages the inner ends of the levers 68, causing them to shift the pressure ring 26 to the right against the springs 27. This action unclamps the disk or driven member 28 of the clutch from the driving side 22, and the clutch is disengaged so that the transmission input shaft 20 is not driven by the engine. It will be noted that the one-way brake 52 provides no interference with the clutch-actuating mechanism 65. This is due to the placing of the one-way brake outside of the clutch-actuating mechanism, which outside placing is made feasible by the location of the fixed sleeve 62 within the active element of the one-way brake, namely, the spiral member 55.

The operation of the entire device of Fig. 1 is as follows. Assume that the engine or other driving means tends to rotate the driving shaft 10 in a counterclockwise direction if viewed in the direction of the arrows 4—4, designating the location of the sectional view of Fig. 4 in Fig. 1. The casing 13 and the impeller 15 of the fluid coupling 14 will also rotate, and when they have attained a sufficient speed they will cause rotation of the runner 16 through the action of the fluid contained in the fluid coupling. This causes the hub part 17, and the clutch driving member 22, keyed thereto, to rotate. If the clutch 23 is engaged as it is shown to be in Fig. 1, the clutch driven member 28 will also rotate causing the driven shaft 20 to rotate. The rotation of the driven shaft 20 which constitutes the input shaft of the transmission 30 is communicated in various ways to the output shaft 45 of the transmission through the gears contained in the transmission casing 31. Assume, for example, that the transmission gears are positioned as shown in Fig. 1, with the sleeve 34 so positioned as not to be in driving engagement with the toothed section 33 on the input shaft 20. Then drive is transmitted from the shaft 20 through the gear 32, the gear 36, the clutch 38, and the gear section 39 to the gear 40. If now the sleeve 42 is shifted to the left into engagement with the toothed section 41 on the gear 40, the gear 40 is directly connected to the output shaft 45. If a lower ratio of speed of output shaft 45 to speed of input shaft 20 is desired, the sleeve 42 is shifted to the right into engagement with the toothed section 46 on gear 47. Then drive is transmitted from the input shaft 20 through the gear 32, the gear 36, the clutch 38, the gear section 48, the gear 47, and the sleeve 42 to the output shaft 45. The position of the sleeve 42 may be suitably manually controlled. The sleeve 34 may, for example, be controlled from the speed of the input shaft 20 through suitable automatically operated means, not shown. When the speed of the input shaft 20 reaches a certain amount, the sleeve 34 will automatically shift to the left, engaging the toothed section on the input shaft 20. Thus there is established a direct drive between the input shaft 20 and the gear 40. If under these conditions it is desired to connect the output shaft 45 directly to the input shaft 20, the sleeve 42 is shifted to the left so as to effect a direct connection between the gear 40 and the output shaft 45. If with the gear 40 directly connected to the input shaft 20 it is desired to have the output shaft 45 rotate at a lower speed than the input shaft 20, the sleeve 42 is shifted to the right to connect the gear 47 to the output shaft 45. At this time drive of the input shaft 20 is transmitted through the toothed section 33, the sleeve 34, the gear 40, the gear section 39, the gear section 48, the gear 47, and the sleeve 42 to the output shaft 45. The one-way clutch 38 will permit the compound gear 37 to rotate faster than the gear 36 as is required when there is a direct drive between the input shaft 20 and the gear 40. When the speed of the input shaft 20 falls below a certain value, the sleeve 34 will automatically shift to the right, causing a resumption of the driving conditions originally described. When it is desired to reverse the direction of the output shaft 45, the idler gear 51 is axially shifted to the right into engagement with the gear 49. Then drive is transmitted from the input shaft 20 through the gear 32, the gear 36, the clutch 38, the gear section 48, the idler gear 51, and the gear 49 to the output shaft 45. Conceivably, when the transmission is in reverse, the speed of the shaft 20 may become sufficiently high to cause the sleeve 34 to become engaged with the toothed section on the gear 20. Then drive will be transmitted from the input shaft 20 to the output shaft 45 through the gear 20, the sleeve 34, the gear 40, the gear section 39, the gear section 48, the idler gear 51, and the gear 49.

Figures 4, 5:
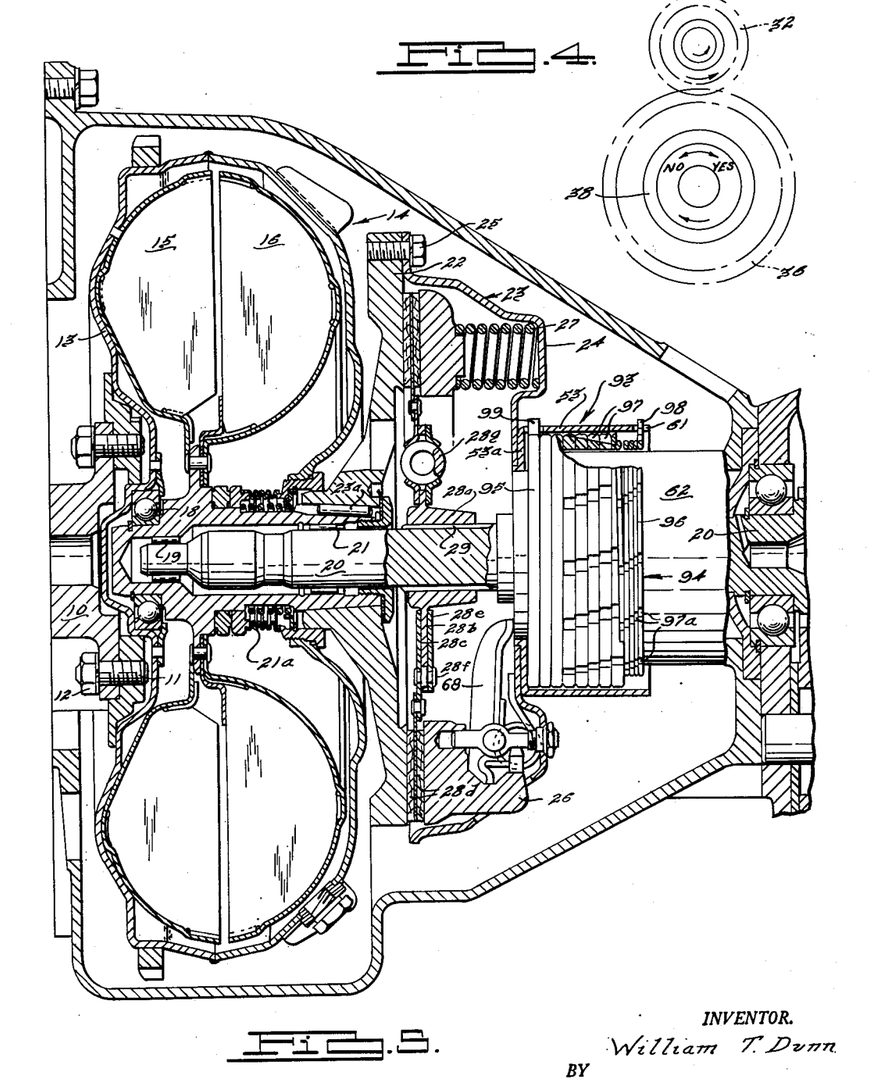
Fig. 4 is a diagrammatic view taken along the line 4—4 of Fig. 1.
Fig. 5 is a sectional view generally similar to Fig. 1, showing a modified form of the one-way brake of the present invention.

The manner of operation of the one-way clutch 38 is best seen in Fig. 4. In this figure the input shaft 20 and the gear 32 formed thereon are rotating in a counterclockwise direction and thus cause the gear 36 to rotate in a clockwise direction. The clutch 38 is so constructed that as indicated in the yes-no designation in Fig. 5, the compound gear unit 37 may rotate with respect to the gear 36 in a clockwise direction but may not rotate with respect to it in a counterclockwise direction. Thus the compound gear unit 37 may rotate faster than but not slower than the gear 36 in a clockwise direction. If the gear unit 37 rotates in a counterclockwise direction, it will cause a counterclockwise rotation of the gear 36.

Figure 3:
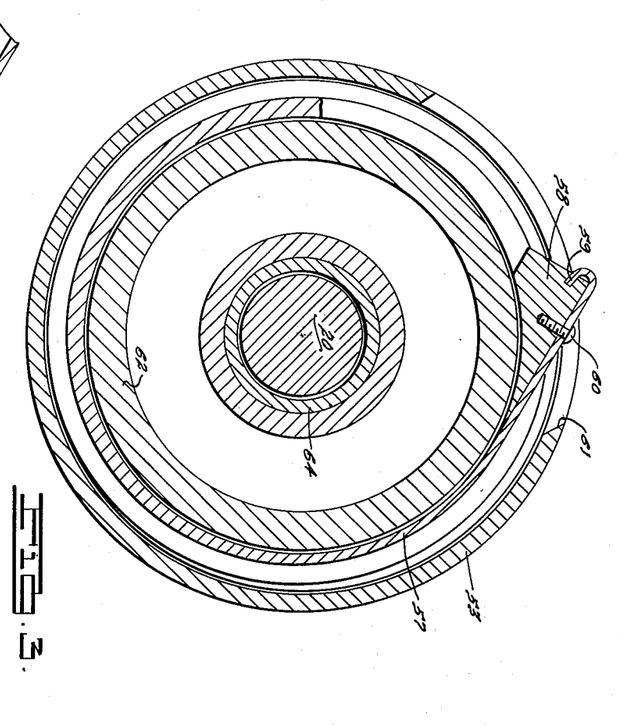
Fig. 3 is a sectional view taken on the line 3—3 of Fig. 1.

Let us now consider the desired function and purpose of the one-way brake 52 of Figs. 1 and 3. If the vehicle in which the driving means is mounted is parked on an incline such as to cause the vehicle to roll backwards, and it is impossible or undesirable to use a special brake to prevent such backwards movement, the engine alone cannot be relied upon to prevent the backward movement, for the runner 16 of the fluid coupling 14 may rotate at low speeds with respect to the impeller 15. The one-way brake 52 will prevent such backwards movement in the following manner. Backward movement of the vehicle would cause the output shaft 45 of the transmission to rotate in a clockwise direction if viewed in the direction of the arrows 3—3 and 4—4 of Fig. 1. If now the sleeve 42 engages either the toothed section 46 of the gear 47 or the toothed section 41 of the gear 40, the clockwise rotation of the output shaft 45 tending to be produced by the backward movement of the vehicle would result in counterclockwise rotation of the compound gear 37. Since, as seen in Fig. 4, the one-way clutch 38 will prevent counterclockwise movement of the compound gear 37 with respect to the gear 36, there will be a tendency for counterclockwise movement of the gear 36 to be produced. This will result in an attempted clockwise movement of the gear 32 and the input shaft 20, which will be transmitted through the clutch 23, if engaged, to the tubular section 53. As was previously explained and is self-evident from Fig. 3, clockwise movement of the tubular section 53 cannot take place, because the resultant attempted clockwise movement of the spiral member 55 will wind up this member, causing it to grip the fixed sleeve 62. Thus clockwise movement cannot take place. If it is desired to permit the aforementioned backward movement of the vehicle, the clutch 23 may be disengaged, and thereby the input shaft 20 is freed from the one-way brake 52. It may be desirable to prevent backward movement of the vehicle at other times than when the vehicle is parked. For example, the vehicle may be temporarily stopped in traffic under conditions that would make it impossible to speed the engine sufficiently to cause the impeller 15 of the fluid coupling to rotate fast enough in a clockwise direction to prevent counterclockwise movement of the runner 16. It is only required that the clutch 23 be engaged and that the sleeve 42 be in one of its engaged positions.

If the sleeve 34 engages the toothed section 33 associated with gear 32 formed on input shaft, then backward movement of the vehicle would produce clockwise movement of the output shaft 45, which would produce clockwise movement of the input shaft 20, either directly with the sleeve 42 engaging the toothed section 41 on the gear 40, or indirectly with the sleeve 42 engaging the toothed section 48 on the gear 47. Such clockwise movement of the input shaft, with the clutch 23 engaged is prevented by the one-way brake 52, as previously described.

If the vehicle is on an incline such as would cause it to move forward, this may be prevented through engagement of the idler gear 51 with the gear 49 and engagement of the clutch 23. Forward movement of the vehicle would result in counterclockwise rotation of the output shaft 45 which would be transmitted through the gears 49 and 51 as counterclockwise rotation to the compound gear 37. As previously described, the one-way clutch 38 will not permit counterclockwise rotation of the compound gear 37 without counterclockwise rotation of the gear 36. Counterclockwise rotation of the gear 36 would result in clockwise rotation of the gear 32 and the input shaft 20. With the clutch 23 engaged, clockwise rotation of the driving side of the clutch would result. However, this is impossible because of the action of the spiral member 55 of the one-way brake, as was previously described.

The one-way brake operates through the clutch 23 and thus shocks incident to use of the one-way brake are imposed upon the clutch, which is designed to take the shocks in the coil springs 28ᵍ. Thus there is less shock imposed on the one-way brake itself.

Figure 2:
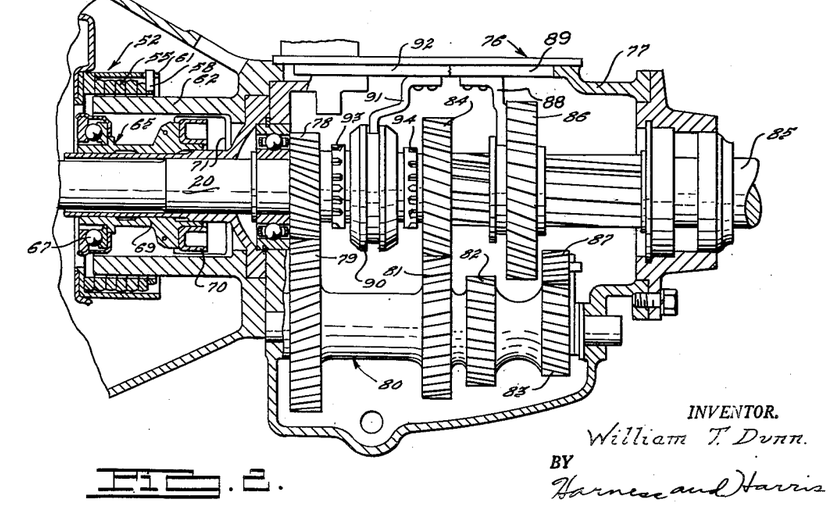
Fig. 2 is a longitudinal sectional view of a driving means including a modified form of transmission, to which driving means the novel brake of the present invention is applied.

Fig. 2 shows the one-way brake 52 in use with a different form of change speed transmission which is hereby designated with the reference character 76. A transmission casing 77 is provided in which is positioned a gear 78 formed on the end of the driven or input shaft 20. The gear 78 continuously meshes with a gear section 79 forming part of a compound gear 80 which also includes gear sections 81, 82, and 83. The gear section 81 continuously meshes with a gear 84 rotatably supported upon a transmission output shaft 85. A gear 86 is slidably and drivingly connected with the output shaft 85 so as to mesh either with the gear section 82 or with idler gear 87 continuously meshing with the gear section 83. The position of the gear 86 is controlled by a fork 88 attached to a rail 89. When the gear 86 engages the gear section 82, the transmission 76 is in the so-called first or low, drive being transmitted from the input shaft 20 through the gear 78, the gear section 79, the gear section 82, and the gear 86 to the output shaft 85. When the gear 86 meshes with the idler gear 87, the transmission is in reverse, the shaft 85 rotating in a clockwise direction when viewed from right to left if the input shaft 20 rotates in a counterclockwise direction. In this condition drive is transmitted from the input shaft 20 through the gear 78, the gear section 79, the gear section 83, the idler gear 87, and the gear 86 to the output shaft 85. Positioned between the gears 78 and 89 is a shifting member 90 controlled by a fork 91 attached to a rail 92. The shifting member 90 is drivingly connected to the output shaft 85 and has at one end an internal clutching section (not shown) engageable with a mating clutching section 93 formed on the end of the input shaft 20. Another internal clutching section (not shown) is formed on the other end of the shifting member 90 and is adapted to mesh with a mating clutching section 94 formed on the gear 84. The shifting member 90 has slidable driving engagement with the output shaft 85. When the shifting member 90 is moved to the right so that the internal clutching section on the right end engages the clutching section 94 formed on the gear 84, the transmission 76 is in second or intermediate, drive being transmitted from the input shaft 20 through the gear 78, the gear section 79, the gear section 81, the gear 84, and the shifting member 90 to the output shaft 85. When the member 90 is moved to the left, the internal clutching section on the left end engages the clutching section 93 formed on the end of the input shaft 20, and the transmission is in third or direct or high, the input shaft being directly connected to the output shaft 85 through the member 90 and thereby causing the output shaft 85 to rotate at the same speed as the input shaft 20.

The one-way brake 52 functions with the transmission 76 of Fig. 2 in the manner described for Fig. 1. If backward movement of the vehicle is to be prevented, the clutch connecting the fluid coupling and the input shaft 20 is engaged, and the member 90 is shifted to the right or to the left, so as to be engaged either with gear 84 or with gear 78, or the gear 86 is shifted to the left into engagement with the gear section 82. Thus clockwise rotation of the output shaft 79 tending to be produced by backward movement of the vehicle would cause clockwise movement of the input shaft 20 and of the spiral member 55 of the one-way brake. However, the spiral member through winding up on attempted clockwise rotation, grips the fixed sleeve 62 and thereby prevents clockwise movement of the input shaft 20 and the output shaft 85 and backward movement of the vehicle. When backward movement of the vehicle is to be allowed, the clutch is disengaged, and the input shaft 20 may rotate in a clockwise direction independently of the one-way brake 52. If forward movement of the vehicle is to be prevented, the gear 86 is shifted into engagement with the idler gear 87. Forward movement of the vehicle would result in counterclockwise movement of the output shaft 85, which would be transmitted through the gear 86, the idler gear 87, the gear section 83, the gear section 79, and the gear 78 in the form of clockwise rotation of the input shaft 20. Since engagement of the clutch prevents relative rotation between the input shaft 20 and the spiral member 55, the gripping of the fixed sleeve 62 by the spiral member will prevent clockwise rotation of the input shaft 20. If the vehicle is to be allowed to move forwardly, the clutch is disengaged.

Fig. 5 shows a modified form of one-way brake 93, in which the spiral member 55 is replaced by a spiral member 94 formed in two sections 95 and 96. The section 95 is formed of relatively thick and wide spiral stock and provided in certain turns with a plurality of notches 97 increasing in depth from turn to turn. The section 96 has a plurality of notches 97ᵃ and is of relatively thin and narrow spiral stock and is attached to the end of the section 95 where the notches 97 are of the greatest depth. The end of the section 96 carries a centrifugal weight 98 positioned in the wide recess 61 formed in the end of the tubular section 53, forming the part of the one-way brake 93 attached to the clutch cover 24 by the flange 53ᵃ. The spiral member 94 is rotatable with the tubular section 53 by virtue of an undesignated opening in the tubular section 53 and an outwardly extending end 99 on the section 95 fitting in the opening. The direction of the spiral of the member 94 is such as to cause the member 94 to tend to unwind during rotation produced by conventional engine operation and transmitted to the member through the fluid coupling 14, the driving side 22 of the clutch 23, and the tubular section 53. The permitted direction of rotation may be counterclockwise when viewed from left to right, as in Fig. 3. By tending to unwind, the spiral member 94 stays released from the fixed sleeve 62, and there is no opposition to rotation of the spiral member. Sufficient speed thereof causes the weight 98 to move outwards, thereby relieving the spiral member 94 of drag upon the fixed sleeve 62. The output shaft 20 might tend to rotate in a counterclockwise direction because of coasting of the vehicle with the transmission in gear. With the clutch 23 engaged, the spiral member 94 of the one-way brake 93 will also rotate in a counterclockwise direction, which is permitted because of the unwinding tendency of the spiral member 94.

The spiral member 94 may not rotate in a clockwise direction, because attempted rotation in this direction winds up the spiral member, causing it to grip the fixed sleeve 62. With the clutch 23 engaged, any movement of the vehicle tending to produce clockwise rotation of the input shaft 20 will produce attempted clockwise rotation of the spiral member, which is impossible, and so such vehicle movement is prevented. This prevented vehicle movement will be backward if the transmission is set for forward movement by the engine and will be forward if the transmission is set for rearward movement.

The one-way brake 93 may be associated through the input shaft 20, for example, with the type of transmission shown in Fig. 1 or with the type shown in Fig. 2.

The section 96 of the spiral member 94 may be considered a "teaser" portion, because by virtue of its relative thinness and narrowness, it is readily responsive to rotation in one direction or the other to initiate the gripping or releasing of the fixed sleeve 62 by the spiral member 94.

Actuating mechanism for the clutch in Fig. 5 is not seen, but it will be understood that this mechanism is located within the fixed sleeve 62, as shown in the modification of Fig. 1.

I claim:

1. The combination with an engine, a change-speed transmission, a fluid power-transmitting device, means drivingly connecting the engine and the fluid power-transmitting device, and means drivingly connecting the change-speed transmission and the fluid power-transmitting device, of a one-way brake associated with the last mentioned means and including a spiral member adapted to change its twist in response to drive transmitted thereto in one direction or the other thereby to grip or to release, and means associated with the spiral member for causing sufficient speed of the spiral member in the direction producing release of the spiral member to eliminate drag of the spiral member.

2. The combination with an engine, a change-speed transmission, a clutch having a driving side and a driven side, means for drivingly connecting the engine with the driving side of the clutch, and means for drivingly connecting the transmission with the driven side of the clutch; of a one-way brake associated with the driving side of the clutch and including a spiral member adapted to change its twist in response to drive transmitted thereto in one direction or the other thereby to grip or to release and means associated with the spiral member for causing sufficient speed of the spiral member in the direction producing release thereof to eliminate drag thereof.

3. The combination with an engine, a change-speed transmission having an input shaft and an output shaft and settable in a first driving arrangement involving rotation of the shafts in the same direction and in a second arrangement involving rotation of the shafts in opposite directions, and a clutch having a driving side adapted to be drivingly connected with the engine and a driven side adapted to be drivingly connected with the input shaft of the transmission; of a one-way brake associated with the driving side of the clutch for preventing during engagement of the clutch the output shaft from rotating the input shaft in a direction opposite to that produced by normal engine operation with the transmission either in the first drive-transmitting arrangement or in the second drive-transmitting arrangement, said one-way brake comprising a fixed means and a spiral member having surrounding relation with respect to one another, the spiral member being connected at one end to the driving side of the clutch and being free at its other end so as to be adapted to change its twist in response to drive through the said one end in one direction or the other for gripping or releasing the fixed means.

4. The combination with an engine, a change-speed transmission having an input shaft and an output shaft and settable in a first driving arrangement involving rotation of the shafts in the same direction and in a second arrangement involving rotation of the shafts in opposite directions, and a clutch having a driving side adapted to be drivingly connected with the engine and a driven side adapted to be drivingly connected with the input shaft of the transmission; of a one-way brake associated with the driving side of the clutch for preventing during engagement of the clutch the output shaft from rotating the input shaft in a direction opposite to that produced by normal engine operation with the transmission either in the first drive-transmitting arrangement or in the second drive-transmitting arrangement, said one-way brake comprising a fixed means and a spiral member having surrounding relation with respect to one another, the spiral member being connected at one end to the driving side of the clutch and being free at its other end so as to be adapted to change its twist in response to drive through the said one end in one direction or the other for gripping or releasing the fixed means, and means associated with the free end of the spiral member for causing sufficient speed of the spiral member in a direction producing release of the spiral member from the fixed means to eliminate drag of the spiral member upon the fixed means.

5. The combination with an engine, a change-speed transmission having an input shaft and an output shaft and settable in a first driving arrangement involving rotation of the shafts in the same direction and in a second arrangement involving rotation of the shafts in opposite directions, and a clutch having a driving side adapted to be drivingly connected with the engine and a driven side adapted to be drivingly connected with the input shaft of the transmission; of a one-way brake associated with the driving side of the clutch for preventing during engagement of the clutch the output shaft from rotating the input shaft in a direction opposite to that produced by normal engine operation with the transmission either in the first drive-transmitting arrangement or in the second drive-transmitting arrangement, said one-way brake comprising a fixed means, a spiral member surrounding the fixed means and being connected at one end to the driving side of the clutch and free at its other end so as to be adapted to change its twist in response to drive through the said one end in one direction or the other for gripping or releasing the fixed means, the said other end of the spiral member being weighted for causing a sufficient speed of the said one end thereof in the direction producing release of the spiral element from the fixed means to move the weighted end outwards to eliminate drag of the spiral element on the fixed means.

6. The combination with a transmission having a unidirectional shaft and a two-direction output shaft and being settable in a first drive-transmitting arrangement involving rotation of the output shaft in the same direction as the unidirectional shaft and a second drive-transmitting arrangement involving rotation of the output shaft in the opposite direction, of a one-way brake associated with the unidirectional shaft for preventing the output shaft of the transmission from reversing the rotation of the unidirectional shaft, said one-way brake comprising a fixed means and a spiral member having surrounding relation with respect to one another, the spiral member being associated at one end with the unidirectional shaft and being free at its other end so as to be able to change its twist in response to drive through the said one end in one direction or the other for gripping or releasing the fixed means, and means associated with the free end of the spiral member for causing sufficient speed of the spiral member in a direction producing release of the spiral member from the fixed means to eliminate drag of the spiral member upon the fixed means.

7. The combination with an engine, a change-speed transmission, a slip-drive power-transmitting device, means drivingly connecting the engine and the slip-drive power-transmitting device, and means drivingly connecting the change-speed transmission and the slip-drive power-transmitting device, of a one-way brake comprising a fixed means, and a flexible member, said flexible member having a portion connected with the means connecting the change speed transmission and the slip-drive power-transmitting device and another portion free thereof adapted to be moved to vary the shape of the flexible member on rotation thereof, the fixed means and the flexible member having a surrounding relation with respect to one another, drive of the flexible member in one direction or the other adjusting the said surrounding relation whereby the flexible member and the fixed means grip or release one another.

8. The combination with an engine, a change-speed transmission, a fluid power-transmitting device, means drivingly connecting the engine and the fluid power-transmitting device, and means drivingly connecting the change-speed transmission and the fluid power-transmitting device, of a one-way brake comprising a fixed means, a flexible member having a portion connected with the means connecting the change-speed transmission and the fluid power-transmitting device and another portion free thereof adapted to be actuated to vary the shape of the flexible member, the fixed means and the flexible member having a surrounding relation with respect to one another, drive of the flexible member in one direction or the other adjusting the said surrounding relation and causing the flexible member and fixed means to grip or release one another, and means connected with the flexible member for causing sufficient speed of the flexible member in the direction producing release of the flexible member and fixed means from one another to eliminate drag between the member and the fixed means.

9. The combination with an engine, a change-speed transmission, a clutch having a driving side and a driven side, means for drivingly connecting the engine with the driving side of the clutch, and means for drivingly connecting the transmission with the driven side of the clutch; of a one-way brake comprising a fixed means, and a flexible member connected with the driving side of the clutch and extending so as to cause the fixed means and the member to have a surrounding relation with respect to one another, drive of the flexible member in one direction or the other varying the shape thereof as well as the said surrounding relation to thereby cause the member and fixed means to grip or release one another.

10. The combination with an engine, a change-speed transmission, a clutch having a driving side and a driven side, means for drivingly connecting the engine with the driving side of the clutch, and means for drivingly connecting the transmission with the driven side of the clutch; of a one-way brake comprising a fixed means, a flexible member connected with the driving side of the clutch and extending so as to cause the fixed means and the member to have a surrounding relation with respect to one another, drive of the flexible member in one direction or the other altering the relative positions of the member and the fixed means and adjusting the said surrounding relation so as to cause the member and fixed means to grip or release one another, and means connected with the member for causing sufficient speed of the member in the direction producing release of the member and fixed means from one another to eliminate drag between the member and the fixed means.

11. The combination with a transmission having an input shaft and output shaft and being settable in a first drive-transmitting arrangement involving rotation of the input and output shafts in the same direction and a second drive-transmitting arrangement involving rotation of the input and output shafts in opposite directions, of a clutch comprising driving and driven sides connected to the input shaft and a one-way brake associated with the driving side of the clutch for preventing the output shaft of the transmission from rotating the input shaft in one direction, said brake comprising a fixed means, a flexible member connected with the driving side of the clutch and extending so as to cause the member and fixed means to have surrounding relation with respect to one another, drive of the flexible member in one direction or the other varying the said surrounding relation and causing the member and the fixed means to grip or release one another, and means associated with the flexible member for causing sufficient speed of the member in the direction producing release of the member and the fixed means from one another to eliminate drag between the spiral member and the fixed means.

12. The combination specified in claim 11, the fixed means surrounding the input shaft and the flexible member surrounding the fixed means.

13. In combination, a transmission having a casing and an input shaft, a clutch having a driven side connected with the input shaft and also having a driving side, and a one-way brake for preventing rotation of the input shaft during engagement of the clutch, said brake comprising a sleeve fixed to the transmission casing and surrounding the output shaft, a spiral member surrounding the sleeve, means connecting one end of the spiral member and the driving side of the clutch so as to cause attempted drive of the spiral member by the driving side of the clutch in one direction or the other make the spiral member grip or release the sleeve, and means connected with the spiral member so as to cause sufficient speed of the spiral member in the direction producing release of the spiral member from the sleeve to eliminate drag of the spiral member upon the sleeve.

14. The combination specified in claim 13 and further including actuating means positioned about the input shaft and within the sleeve and slidable therealong for controlling engagement of the clutch.

15. In combination, a clutch having a driven side and a driving side housing the driven side and carrying means for controlling driving engagement of the driving and driven sides, actuating means engageable with the controlling means, a transmission including a casing and an input shaft drivingly engaging the driven side of the clutch and projecting from the clutch, a fixed means, a first sleeve fixed to the transmission casing and surrounding the shaft and providing a sliding support for the actuating means, a second sleeve surrounding the first sleeve and actuating means and fixed to the transmission casing, a spiral member surrounding the second sleeve, means connecting the driving side of the clutch and one end of the spiral member so as to cause drive of the spiral member by the driving side of the clutch in one direction or the other make the spiral member grip or release the second sleeve, and means associated with the other end of the spiral member for causing sufficient speed of the spiral member in the direction producing release of the spiral member from the second sleeve to eliminate drag of the spiral member upon the second sleeve.

16. In combination, a transmission including a unidirectional shaft, a two-direction output shaft, and gearing connecting the shafts so as to make the output shaft rotate in the same direction as the unidirectional shaft or in the opposite direction, and a one-way brake associated with the unidirectional shaft for preventing the output shaft from rotating in the said opposite direction during setting of the transmission for rotation of the output shaft in the said same direction and from rotating in the said same direction during setting of the transmission for rotation of the output shaft in the said opposite direction, said one-way brake comprising a fixed sleeve, a spiral member surrounding the fixed sleeve, a tubular section surrounding the spiral member and drivingly connected with the unidirectional shaft, means connecting one end of the spiral member to the tubular section for causing drive of the spiral member in one direction or the other by the tubular section and the unidirectional shaft to make the spiral member grip or release the fixed sleeve, and a weight connected to the other end of the spiral member so as to be adapted to move outwards in response to a sufficient speed of the spiral member in the direction releasing the spiral member from the fixed sleeve for eliminating drag of the spiral member upon the fixed sleeve.

17. The combination specified in claim 16, the means connecting the said one end of the spiral member and the tubular section comprising an outwardly extending portion on said end and an opening in the tubular section receiving the said portion, the tubular section having a wide slot at one end for receiving the weight on the spiral member.

18. In combination, a shaft, a clutch having a driven side drivingly connected to the shaft, a driving side housing the driven side, and control means mounted on the driving side for engaging and disengaging the clutch, a first fixed sleeve surrounding the shaft, actuating means for the control means slidably mounted on the first fixed sleeve and a one-way brake for preventing rotation of the shaft in one direction during engagement of the clutch, said brake comprising a second fixed sleeve surrounding the first fixed sleeve and the actuating means, a spiral member surrounding the second fixed sleeve, and means connecting the spiral member and the driving side of the clutch for causing the spiral member to respond to drive in one direction or the other by gripping or releasing the fixed sleeve.

19. In combination, a shaft, a clutch having a driven side drivingly connected to the shaft, a driving side housing the driven side, and control means mounted in the driving side for engaging and disengaging the clutch, a first fixed sleeve surrounding the shaft, actuating means for the control means slidably mounted on the first fixed sleeve, and a one-way brake for preventing rotation of the shaft in one direction during engagement of the clutch, said brake comprising a second fixed sleeve surrounding the first fixed sleeve and the actuating means, a spiral member surrounding the second fixed sleeve, means connecting the spiral member and the driving side of the clutch for causing the spiral member to respond to drive in one direction or the other by gripping or releasing the fixed sleeve, and means associated with the spiral member for causing sufficient speed of the spiral member in the direction producing release of the spiral member from the fixed sleeve to eliminate drag of the spiral member upon the fixed sleeve.

20. In combination, an input shaft for a transmission, a clutch having a driving side and a driven side drivingly connected to the input shaft, and a one-way brake associated with the driving side of the clutch for preventing rotation of the input shaft in one direction during engagement of the clutch, said brake comprising a fixed internal member and a movable external member drivingly connected to the driving side of the clutch and surrounding the internal member.

21. In combination, an input shaft for a transmission, a clutch having a driving side and a driven side drivingly connected to the input shaft, a one-way brake associated with the driving side of the clutch for preventing rotation of the input shaft in one direction during engagement of the clutch, said brake comprising a fixed internal member and a movable external member drivingly connected to the driving side of the clutch and surrounding the internal member, and actuating means positioned between the input shaft and the internal member for controlling operation of the clutch.

22. The combination with an engine, a change-speed transmission including an input shaft, a fluid power-transmitting device, means drivingly connecting the engine and the fluid power-transmitting device, and means drivingly connecting the input shaft and the fluid power-transmitting device, of a one-way brake for preventing rotation of the input shaft in one direction, said brake comprising a fixed internal member and a movable external member surrounding the fixed member and drivingly connected with the last mentioned means.

23. The combination with an engine, a change-speed transmission including an input shaft, a fluid power-transmitting device, means drivingly connecting the engine and the fluid power-transmitting device, and means drivingly connecting the input shaft and the fluid power-transmitting device, of a one-way brake for preventing rotation of the input shaft in one direction, said brake comprising a fixed internal member and a movable external member surrounding the fixed member and drivingly connected with the last mentioned means, and speed-responsive means for causing sufficient speed of the input shaft in one direction to eliminate drag in the one-way brake.

24. The combination with an engine, a change-speed transmission including an input shaft, a fluid power-transmitting device, a clutch having a driving side connected with the fluid device and a driven side connected with the input shaft, means drivingly connecting the engine and the fluid device; of a one-way brake for preventing rotation of the input shaft in one direction during engagement of the clutch, said brake comprising a fixed internal member surrounding the input shaft and a movable external member surrounding the fixed internal member and drivingly connected with the driving side of the clutch.

25. The combination with an engine, a change-speed transmission including an input shaft, a fluid power-transmitting device, a clutch having a driving side connected with the fluid device and a driven side connected with the input shaft, means drivingly connecting the engine and the fluid device; of a one-way brake for preventing rotation of the input shaft in one direction during engagement of the clutch, said brake comprising a fixed internal member surrounding the input shaft and a movable external member surrounding the fixed internal member and drivingly connected with the driving side of the clutch, and speed responsive means for causing sufficient speed of the input shaft in the said one direction to eliminate drag in the one-way brake.

26. The combination with an engine, a change-speed transmission including an input shaft, a fluid power-transmitting device, a clutch having a driving side connected with the fluid device and a driven side connected with the input shaft, means drivingly connecting the engine and the fluid device; of a one-way brake for preventing rotation of the input shaft in one direction during engagement of the clutch, said brake comprising a fixed internal member surrounding the input shaft and a movable external member surrounding the fixed internal member and drivingly connected with the driving side of the clutch, and actuating means positioned between the fixed internal member and the input shaft for controlling operation of the clutch.

27. The combination with an engine, a change-speed transmission including an input shaft, a fluid power-transmitting device, a clutch having a driving side connected with the fluid device and a driven side connected with the input shaft, means drivingly connecting the engine and the fluid device; of a one-way brake for preventing rotation of the input shaft in one direction during engagement of the clutch, said brake comprising a fixed internal member surrounding the input shaft and a movable external member surrounding the fixed internal member and drivingly connected with the driving side of the clutch, speed responsive means for causing sufficient speed of the input shaft in the said one direction to eliminate drag in the one-way brake, and actuating means positioned between the input shaft and the fixed internal sleeve for controlling operation of the clutch.

28. The combination with a change-speed transmission having an input shaft and an output shaft, and a clutch having a driving side and a driven side drivingly connected with the input shaft; of a one-way brake for preventing during engagement of the clutch the output shaft from rotating in a direction opposed to that for which the transmission is set, said one-way brake comprising a fixed sleeve surrounding the input shaft, a spiral member mounted on the fixed sleeve, means drivingly connecting the driving side of the clutch and one end of the spiral member for causing the spiral member to respond to rotation of the driving side of the clutch in one direction or the other by gripping or releasing the fixed sleeve, the spiral member having the majority of its turns of generally uniform radial thickness and at the end other than that connected to the driving side of the clutch, a turn provided with progressively decreasing radial thickness so as to be radially flexible for initiating the aforesaid gripping or releasing of the sleeve, and a weight associated with the said other end of the spiral member for causing sufficient speed of the spiral member in the direction producing release of the spiral member from the sleeve to eliminate drag of the spiral member on the sleeve.

29. The combination with a change-speed transmission having an input shaft and an output shaft, and a clutch having a driving side and a driven side drivingly connected with the input shaft; of a one-way brake for preventing during engagement of the clutch the output shaft from rotating in a direction opposed to that for which the transmission is set, said one-way brake comprising a fixed sleeve surrounding the input shaft, a spiral member mounted on the fixed sleeve, means drivingly connecting the driving side of the clutch and one end of the spiral member for causing the spiral member to respond to rotation of the driving side of the clutch in one direction or the other by gripping or releasing the fixed sleeve, the spiral member having at its drive-receiving end a heavy section having turns of relatively great thickness and width, the heavy section having connected thereto a light section having turns of relatively small thickness and width so as to be flexible for initiating the aforesaid gripping or releasing, and a weight associated with the free end of the light section for causing sufficient speed of the spiral member in the direction producing release of the spiral member from the sleeve to eliminate drag of the spiral member on the sleeve.

30. In combination, an engine driven member, a power transmission unit including input and output members, a slip-drive power transmitting device interposed between said engine driven member and said power transmission unit, means drivingly connecting the engine driven member and the slip-drive power transmitting device, drive transmitting means including a clutch having driving and driven sides drivingly connecting the slip-drive power transmitting device and the input member of the power transmission unit, and a one-way brake comprising a flexible spiral member anchored at one end to and carried by the driving side of said clutch and adapted to be connected between the driving side of said clutch and a relatively fixed member, said one-way brake being arranged to resist rotation of said transmission unit input member in one direction when said clutch is engaged.

31. In combination, an engine driven member, a power transmission unit including input and output members, a slip-drive power transmitting device interposed between said engine driven member and said power transmission unit, means drivingly connecting the engine driven member and the slip-drive power transmitting device, drive transmitting means including a clutch drivingly connecting the slip-drive power transmitting device and the input member of the power transmission unit, and a one-way brake carried by said clutch and adapted to be connected between said clutch and a relatively fixed member, said one-way brake being arranged to resist rotation of said transmission unit input member in one direction when said clutch is engaged, said one-way brake including a spiral member encircling said relatively fixed member that is adapted to change its twist in response to drive transmitted thereto in one direction or the other to thereto grip or release the relatively fixed member.

32. The combination with an engine driven member, a change-speed transmission including input and output members, a clutch interposed between said engine driven member and said transmission having a driving side and a driven side, means for drivingly connecting the engine driven member with the driving side of the clutch, and means for drivingly connecting the transmission input member with the driven side of the clutch; of a one-way brake connected between the driving side of the clutch and a relatively fixed member, said brake being arranged so as to be positioned between said clutch and said transmission and to encircle a relatively fixed, contiguously arranged, anchor member, said brake comprising a flexible spiral member having a portion anchored to said clutch and being adapted to change its twist in response to drive transmitted thereto in one direction or the other to thereby grip or to release the contiguously arranged anchor member.

33. The combination with a transmission having an input shaft and output shaft and being settable in a first drive-transmitting arrangement involving rotation of the input and output shafts in the same direction and a second drive-transmitting arrangement involving rotation of the input and output shafts in opposite directions, of a clutch comprising driving and driven engageable elements drivingly connected to the input shaft and a one-way brake connected between a relatively fixed member and the driving element of said clutch device whereby said one-way brake is operative for preventing the output shaft of the transmission from rotating the input shaft in one direction when said clutch is engaged, said one-way brake comprising a flexible spiral member having surrounding relation with respect to said fixed member and to the input shaft, the flexible spiral member having one end connected with the driving element of said clutch and being free at its other end so as to be able to change its shape in response to drive through the said one end in one direction or the other to provide a means for gripping or releasing the fixed member.

34. The combination with a transmission having an input shaft and output shaft and being settable in a first drive-transmitting arrangement involving rotation of the input and output shafts in the same direction and a second drive-transmitting arrangement involving rotation of the input and output shafts in opposite directions, of a clutch device comprising driving and driven engageable elements drivingly connected to the input shaft and a one-way brake connected between a relatively fixed member and the driving element of said clutch device whereby said one-way brake is operative for preventing the output shaft of the transmission from rotating the input shaft in one direction when said clutch is engaged, said one-way brake comprising a flexible spiral member having surrounding relation with respect to said fixed member, the flexible spiral member being connected at one end with the driving element of said clutch device and being free at its other end so as to be able to change its twist in response to drive through the said one end in one direction or the other for gripping or releasing the fixed member, and means associated with the free end of the spiral member for causing sufficient speed of the flexible spiral member in one direction to effect release of the spiral member from the fixed member to eliminate drag of the spiral member upon the fixed member.

WILLIAM T. DUNN.

REFERENCES CITED

The following references are of record in the file of this patent:

UNITED STATES PATENTS

| Number | Name | Date |
|---|---|---|
| 866,456 | George | Sept. 17, 1902 |
| 1,410,423 | Stevens | Mar. 21, 1922 |
| 1,694,181 | Kaplon | Dec. 4, 1928 |
| 2,049,798 | Booth et al. | Aug. 4, 1936 |
| 2,072,059 | Rauen | Feb. 23, 1937 |
| 2,098,021 | Wheeler | Nov. 2, 1937 |
| 2,123,202 | Rauen | July 12, 1938 |
| 2,166,512 | Warwick | July 18, 1939 |
| 2,332,593 | Nutt et al. | Oct. 26, 1943 |
| 2,457,692 | La Brie | Dec. 28, 1948 |
| 2,548,207 | Dunn | Apr. 10, 1951 |